(12) United States Patent
Birtcher et al.

(10) Patent No.: US 8,959,998 B2
(45) Date of Patent: Feb. 24, 2015

(54) ULTRASONIC LIQUID LEVEL SENSING SYSTEMS

(71) Applicant: Air Products and Chemicals, Inc., Allentown, PA (US)

(72) Inventors: Charles Michael Birtcher, Valley Center, CA (US); Thomas Andrew Steidl, Escondido, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/163,407

(22) Filed: Jan. 24, 2014

(65) Prior Publication Data
US 2014/0338442 A1    Nov. 20, 2014

Related U.S. Application Data

(60) Provisional application No. 61/823,625, filed on May 15, 2013.

(51) Int. Cl.
*G01F 23/00* (2006.01)
*G01F 23/28* (2006.01)
*G01F 23/296* (2006.01)

(52) U.S. Cl.
CPC .................................. *G01F 23/2961* (2013.01)
USPC ....................................................... 73/290 V

(58) Field of Classification Search
CPC .............. G01F 23/2968; G01F 23/296; G01F 25/0061; G01N 2291/02836; G01N 29/024; G01N 2291/044; G01N 29/341; G01N 29/348; Y10S 67/908
USPC .............. 73/290 V, 1.82, 290 R, 628, 861.18, 73/861.25, 861.29; 340/621, 620; 367/908
See application file for complete search history.

(56) References Cited

U.S. PATENT DOCUMENTS

| | | | | |
|---|---|---|---|---|
| 4,063,457 | A | * | 12/1977 | Zekulin et al. .............. 73/290 V |
| 4,077,022 | A | * | 2/1978 | Pitts, Jr. ............................ 333/1 |
| 5,437,178 | A | * | 8/1995 | Esin et al. ...................... 73/1.82 |
| 5,842,374 | A | * | 12/1998 | Chang .......................... 73/290 R |
| 6,246,154 | B1 | | 6/2001 | Gluszyk et al. |
| 2004/0173021 | A1 | * | 9/2004 | Lizon et al. ................. 73/290 V |
| 2006/0116584 | A1 | * | 6/2006 | Sudol et al. ................... 600/459 |
| 2010/0257931 | A1 | * | 10/2010 | Partington et al. .......... 73/290 V |

FOREIGN PATENT DOCUMENTS

WO    2009063194 A2    5/2009

\* cited by examiner

*Primary Examiner* — Hezron E Williams
*Assistant Examiner* — Marrit Eyassu
(74) *Attorney, Agent, or Firm* — Rosaleen P. Morris-Oskanian

(57) ABSTRACT

Embodiments of the present invention provide an ultrasonic probe having an increased number (e.g., twelve) of ultrasonic sensors for measuring the level of liquid within a sealed container. The ultrasonic probe includes a neck tube that enables the ultrasonic probe to be used with existing, standardized container fittings despite having an enlarged barrel to accommodate the increased number of ultrasonic sensors. Embodiments of the present invention also provide a system and method in which ultrasonic sensors within an ultrasonic probe are activated one at a time to reduce crosstalk between the ultrasonic sensors and their wiring.

18 Claims, 5 Drawing Sheets

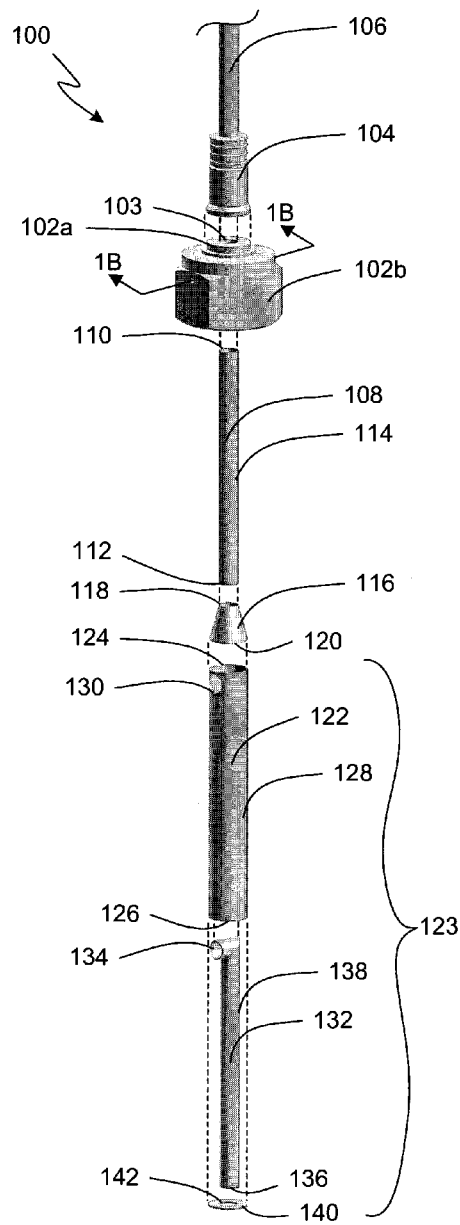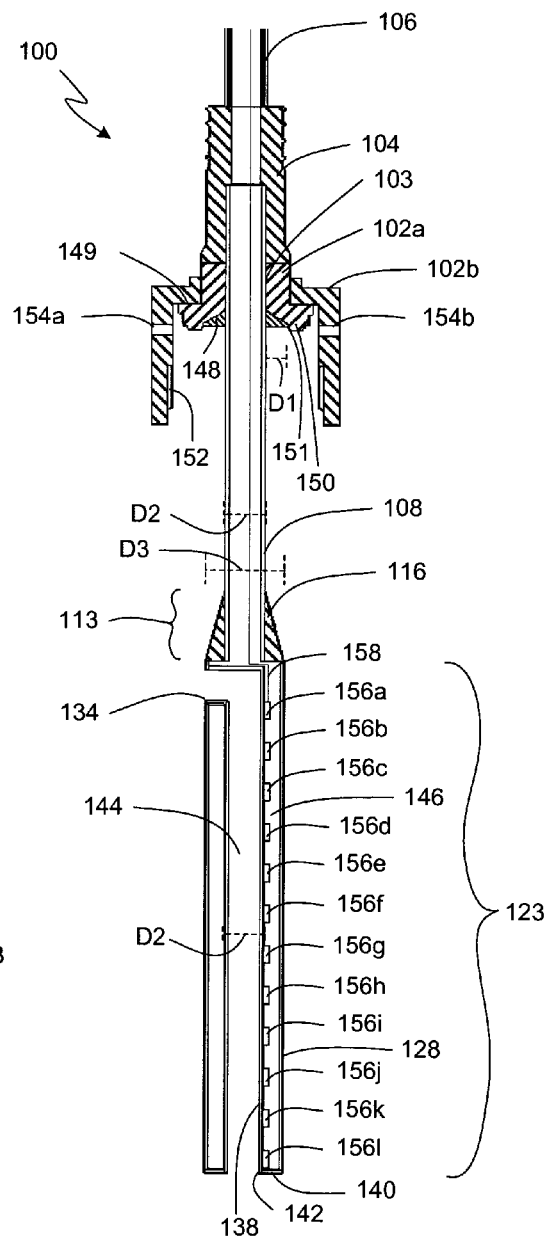
Figure 1A
Figure 1B

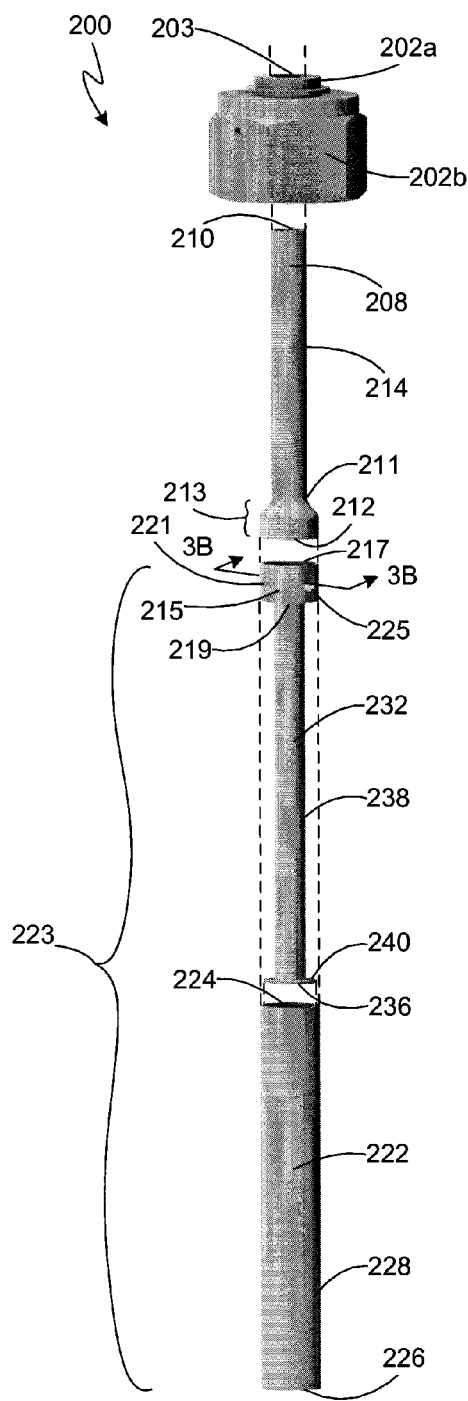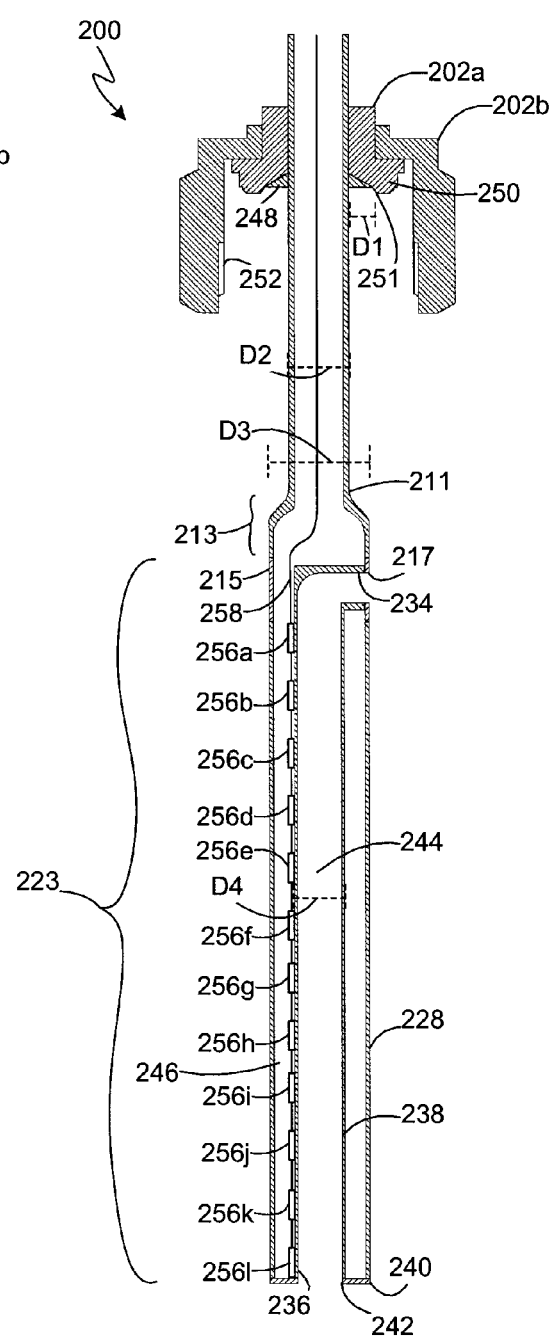
Figure 3A
Figure 3B

ULTRASONIC LIQUID LEVEL SENSING SYSTEMS

CROSS REFERENCE TO RELATED APPLICATIONS

This application claims the benefit of U.S. Provisional Application No. 61/823,625, filed May 15, 2013, which is hereby incorporated by reference as if fully set forth.

BACKGROUND OF THE INVENTION

Semiconductor manufacturing processes involve the use of chemical reagents that must meet strict purity requirements. These liquid chemical reagents are typically contained in sealed containers (e.g., ampoules) to protect against contamination of the chemical reagents and to prevent leakage. The chemical reagents typically require metal containers and container fittings that use metal-on-metal seals to avoid corrosion, contamination, and leakage under elevated pressures. When using a chemical reagent stored in such a container, it is often necessary to be able to determine the amount of chemical reagent left in the container without exposing the chemical reagent to the environment or exposing an operator to the chemical reagent.

Ultrasonic probes are commonly used in the semiconductor industry to measure the level of chemical reagent within a sealed container. A typical design includes multiple ultrasonic sensors positioned in a series along the length of a conduit within the probe, such as the sensors and configuration disclosed in U.S. Pat. No. 5,663,503 to Dam et al. A signal processing device (e.g., a controller, meter, personal computer, etc.) transmits electronic signals to the ultrasonic sensors, which in turn generate bursts of sound waves that pass through the conduit and echo back to the sensors. Each sensor converts the echoed waves it receives into electronic signals that are transmitted back to the signal processing device. The signal processing device then interprets the electronic signals to determine the intensity of the echoed waves as well as the time that elapsed between emission and the arrival of the echoed waves. For each sensor positioned along a particular portion of the conduit, the speed with which the ultrasonic waves travel through the conduit and the intensity of the echoed ultrasonic wave will differ depending on whether that portion of the conduit contains chemical reagent or gas or vapor (i.e., sound travels faster through a liquid medium as compared to gas or vapor). In this manner, the signal processing device can determine the level of the chemical reagent along the length of the conduit and therefore the amount of chemical reagent within the container.

Generally, a greater number of ultrasonic sensors disposed within the ultrasonic probe translates into increased accuracy in measuring chemical reagent levels. However, a larger probe is typically required to accommodate the increased number of ultrasonic sensors and their wiring. Given the exacting nature of semiconductor manufacturing processes and environments, the dimensions of sealed containers, container fittings, seals, and related hardware are largely standardized, which limits the extent to which the ultrasonic probes can be adapted to include a greater number of ultrasonic sensors (e.g., greater than four) without requiring a change to larger fittings and/or non-standardized components.

Accordingly, there is a need in the art for an ultrasonic probe having an increased number of ultrasonic sensors that can be used with existing, standardized container fittings.

SUMMARY OF THE INVENTION

According to one embodiment the present invention, an ultrasonic probe for use with a container is disclosed. The ultrasonic probe comprises a barrel having an outer diameter and a conduit disposed within the barrel, the conduit having an upper opening and a lower opening. A neck tube is coupled to the barrel and a portion of a fitting assembly, the neck tube comprising a shoulder portion, a lower opening defined by the shoulder portion, a side wall, and a first outer diameter defined by the sidewall, the first outer diameter of the neck tube being less than the outer diameter of the barrel. An internal volume is disposed within the barrel, the internal volume being isolated from the conduit. A plurality of ultrasonic sensors is disposed within the internal volume, with each ultrasonic sensor of the plurality of ultrasonic sensors having a wire that extends from the internal volume through the neck tube.

In addition, several specific aspects of the systems and methods of the present invention are outlined below.

Aspect 1. An ultrasonic probe for use with a container, the ultrasonic probe comprising:
 a barrel having an outer diameter;
 a conduit disposed within the barrel;
 a neck tube coupled to the barrel and a portion of a fitting assembly, the neck tube comprising a shoulder portion, a lower opening defined by the shoulder portion, a side wall, and a first outer diameter defined by the sidewall, the first outer diameter of the neck tube being less than the outer diameter of the barrel;
 an internal volume disposed within the barrel, the internal volume being isolated from the conduit; and
 a plurality of ultrasonic sensors disposed within the internal volume, each ultrasonic sensor of the plurality of ultrasonic sensors having a wire that extends from the internal volume through the neck tube.

Aspect 2. The ultrasonic probe of Aspect 1, wherein the portion of the fitting assembly comprises a sealing surface having an inner edge, the inner edge being located at least 2.0 mm from the sidewall of the neck tube.

Aspect 3. The ultrasonic probe of Aspects 1 or 2, wherein the outer diameter of the barrel is at least five-sixteenths of an inch (7.9 mm).

Aspect 4. The ultrasonic probe of any of Aspects 1 through 3, wherein the ratio of the first outer diameter of the neck tube to the outer diameter of the barrel is less than or equal to 0.95.

Aspect 5. The ultrasonic probe of any of Aspects 1 through 3, wherein the ratio of the first outer diameter of the neck tube to the outer diameter of the barrel is greater than or equal to 0.3 and less than or equal to 0.95.

Aspect 6. The ultrasonic probe of any of Aspects 1 through 5, wherein the first outer diameter of the neck tube is no greater than 21.0 mm.

Aspect 7. The ultrasonic probe of any of Aspects 1 through 6, wherein the barrel comprises:
 a collar having an upper opening, a lower opening, a sidewall, a side opening disposed in the sidewall, and an outer diameter defined by the sidewall;
 an outer tube comprising an upper opening, a lower opening, a sidewall, and an outer diameter defined by the sidewall; and
 an inner tube comprising an upper opening, a lower opening, and a sidewall, the upper opening of the inner tube being aligned with the side opening of the collar;
 wherein the inner tube defines the conduit, the internal volume is located between the sidewall of the inner tube and the sidewall of the outer tube, the side opening of the collar is aligned with the upper opening of the inner tube, and the collar is positioned between the neck tube and the outer tube.

Aspect 8. The ultrasonic probe of any of Aspects 1 through 7, wherein the barrel comprises:

a collar having an upper opening, a lower opening, a sidewall, a side opening disposed in the sidewall, and an outer diameter defined by the sidewall, the upper opening of the collar being coupled to the lower opening of the neck tube;

an outer tube comprising an upper opening, a lower opening, a sidewall, and an outer diameter defined by the sidewall, the upper opening of the outer tube being coupled to the lower opening of the collar; and an inner tube coupled to the outer tube and the collar, the inner tube comprising an upper opening, a lower opening, and a sidewall, the upper opening of the inner tube being aligned with the side opening of the collar, the lower opening of the inner tube being aligned with the lower opening of the outer tube;

wherein the inner tube defines the conduit and the internal volume is located between the sidewall of the inner tube and the sidewall of the outer tube.

Aspect 9. The ultrasonic probe of any of Aspects 1 through 8, wherein the lower opening defined by the shoulder portion of the neck tube has a second outer diameter, the second outer diameter being greater than the first outer diameter of the neck tube.

Aspect 10. The ultrasonic probe of Aspect 9, wherein the second outer diameter is substantially equal to the outer diameter of the outer tube and the outer diameter of the collar.

Aspect 11. The ultrasonic probe of any of Aspects 1 through 6, wherein the barrel comprises:

an outer tube comprising an upper opening, a lower opening, a sidewall, and a side opening disposed in the sidewall; and an inner tube coupled to the outer tube, the inner tube comprising an upper opening, a lower opening, and a sidewall, the upper opening of the inner tube being aligned with the side opening of the outer tube, the lower opening of the inner tube being aligned with the lower opening of the outer tube, wherein the inner tube defines the conduit, wherein the internal volume is located between the sidewall of the inner tube and the sidewall of the outer tube.

Aspect 12. The ultrasonic probe of Aspect 11, wherein the shoulder portion of the neck tube comprises:

a shoulder tube coupled to the sidewall of the neck tube, the shoulder tube being coupled to the outer tube, the shoulder tube having an outer diameter that is greater than the first outer diameter.

Aspect 13. The ultrasonic probe of any of Aspects 1 through 12, wherein the portion of the fitting assembly comprises:

a first seal fitting member coupled to a portion of the neck tube, the first seal fitting member comprising a first threaded region and a protruding sealing surface, the protruding sealing surface of the first seal fitting member extending around the neck tube, the protruding sealing surface of the first seal fitting member being separated from the sidewall of the neck tube by a first distance.

Aspect 14. The ultrasonic probe of Aspect 13, further comprising:

a second seal fitting member, the second seal fitting member comprising a second threaded region, wherein the second threaded region is adapted to engage the first threaded region; and a gasket having a through hole through which the neck tube is disposed, the gasket being adapted to be disposed between the protruding sealing surface of the first seal fitting member and a protruding sealing surface of the container.

Aspect 15. The ultrasonic probe of Aspects 13 or 14, wherein the first distance is at least 2.0 mm.

Aspect 16. The ultrasonic probe of any of Aspects 13 through 15, wherein the first seal fitting member comprises a three-quarter-inch (19.1 mm) face seal fitting.

Aspect 17. A system comprising:

a container for holding a liquid, the container comprising:
a body having an upper portion and an internal volume; and
a stem disposed in a hole in the upper portion of the body, the stem having an inner diameter, a sidewall, a lip, and a protruding sealing surface; and an ultrasonic probe for measuring levels of liquid in the internal volume of the container, the ultrasonic probe comprising:

a barrel having an outer diameter that is less than the inner diameter of the stem, the barrel having a conduit disposed within the barrel, the conduit being in flow communication with the internal volume of the body of the container;

a neck tube coupled to the barrel and a portion of a fitting assembly, the neck tube comprising a shoulder portion, a lower opening defined by the shoulder portion, a side wall, and a first outer diameter defined by the sidewall, the first outer diameter of the neck tube being less than the outer diameter of the barrel, wherein a portion of the neck tube is disposed within the stem;

an internal volume disposed within the barrel, the internal volume of the barrel being isolated from the conduit and the internal volume of the body of the container; and a plurality of ultrasonic sensors disposed within the internal volume of the barrel, each ultrasonic sensor of the plurality of ultrasonic sensors having a wire that extends from the internal volume of the barrel and through the neck tube, each ultrasonic sensor of the plurality of ultrasonic sensors being positioned and oriented to emit sound waves into at least a portion of the conduit.

Aspect 18. The system of Aspect 17, wherein the portion of the fitting assembly comprises a sealing surface having an inner edge, the inner edge being located at least 2.0 mm from the sidewall of the neck tube.

Aspect 19. The system of Aspects 17 or 18, wherein the ratio of the first outer diameter of the neck tube to the outer diameter of the barrel is less than or equal to 0.95.

Aspect 20. The system of any of Aspects 17 through 19, wherein the barrel further comprises:

a collar having an upper opening, a lower opening, a sidewall, a side opening disposed in the sidewall, and an outer diameter defined by the sidewall, the upper opening of the collar being coupled to the neck tube;

an outer tube comprising an upper opening, a lower opening, a sidewall, and an outer diameter defined by the sidewall, the upper opening of the outer tube being coupled to the lower opening of the collar; and an inner tube coupled to the outer tube and the collar, the inner tube comprising an upper opening, a lower opening, and a sidewall, the upper opening of the inner tube being aligned with the side opening of the collar, the lower opening of the inner tube being aligned with the lower opening of the outer tube, wherein the inner tube defines the conduit, wherein the internal volume is located between the sidewall of the inner tube and the sidewall of the outer tube.

Aspect 21. The system of any of Aspects 17 through 20, wherein the lower opening defined by the shoulder portion of the neck tube is located below a lower-most portion of the stem when the ultrasonic probe is fully installed on the container.

Aspect 22. The system of any of Aspects 17 through 21, wherein the lower opening defined by the shoulder portion of the neck tube has a second outer diameter, the second outer diameter being greater than the first outer diameter of the neck tube.

Aspect 23. The system of any of Aspects 20 through 22, wherein the second outer diameter is substantially equal to the outer diameter of the outer tube and the outer diameter of the collar.

Aspect 24. The system of any of Aspects 17 through 19, wherein the barrel comprises:

an outer tube comprising an upper opening, a lower opening, a sidewall, and a side opening disposed in the sidewall; and an inner tube coupled to the outer tube, the inner tube comprising an upper opening, a lower opening, and a sidewall, the upper opening of the inner tube being aligned with the side opening of the outer tube, the lower opening of the inner tube being aligned with the lower opening of the outer tube, wherein the inner tube defines the conduit, wherein the internal volume of the barrel is located between the sidewall of the inner tube and the sidewall of the outer tube.

Aspect 25. The system of Aspect 24, wherein the shoulder portion of the neck tube comprises:

a shoulder tube coupled to the sidewall of the neck tube, the shoulder being coupled to the outer tube, the shoulder tube having an outer diameter that is greater than the first outer diameter.

Aspect 26. The system of Aspect 25, wherein the lower opening of the shoulder tube is located below a lower-most portion of the stem when the ultrasonic probe is fully installed on the container.

Aspect 27. The system of any of Aspects 17 through 26, wherein the portion of the fitting assembly comprises:

a first seal fitting member coupled to a portion of the neck tube, the first seal fitting member comprising a first threaded region and a protruding sealing surface extending around the neck tube, the protruding sealing surface of the first seal fitting member being separated from the sidewall of the neck tube by at least 2.0 mm.

Aspect 28. The system of Aspect 27, further comprising:

a second seal fitting member, the second seal fitting member comprising a second threaded region, wherein the second threaded region engages the first threaded region and the lip of the stem of the container engages a portion of the second seal fitting member; and a gasket disposed between the protruding sealing surface of the first seal fitting member and the protruding sealing surface of the stem of the container, the gasket having a through hole through which the neck tube is disposed.

Aspect 29. The system of any of Aspects 17 through 28, wherein the portion of the neck tube disposed within the stem is distanced from the sidewall of the stem by a distance that is greater than or equal to 0.70 mm.

Aspect 30. A system comprising:

a controller that is operatively configured to send and receive electronic signals; and an ultrasonic probe comprising a fitting assembly, a barrel extending downwardly from the fitting assembly, and a plurality of ultrasonic sensors located within the barrel, each of the plurality of ultrasonic sensors being adapted to receive electronic signals sent from the controller, emit sound waves in response to the electronic signals sent from the controller, detect sound waves, and transmit electronic signals to the controller indicative of the detected sound waves;

wherein the controller is programmed to send electronic signals to only one of the plurality of ultrasonic sensors at a time.

Aspect 31. The system of Aspect 30, wherein the controller is programmed to send an electronic signal to a first ultrasonic sensor of the plurality of ultrasonic sensors and receive an electronic signal from the first ultrasonic sensor of the plurality of ultrasonic sensors prior to sending an electronic signal to any other ultrasonic sensor of the plurality of ultrasonic sensors.

Aspect 32. The system of Aspects 30 or 31, wherein the plurality of ultrasonic sensors includes at least 5 ultrasonic sensors.

Aspect 33. The system of Aspects 30 or 31, wherein the plurality of ultrasonic sensors includes at least 12 ultrasonic sensors.

Aspect 34. The system of any of Aspects 30 through 33, wherein each ultrasonic sensor of the plurality of ultrasonic sensors is electrically coupled to the controller by at least one unshielded wire.

Aspect 35. The system of any of Aspects 30 through 34, further comprising a multi conductor shielded cable, wherein all ultrasonic sensors of the plurality of ultrasonic sensors are electrically coupled to the controller by the multi conductor shielded cable.

Aspect 36. A method of operating a probe having a plurality of ultrasonic sensors, the method comprising:

(a) sending an electronic signal to one of the plurality of ultrasonic sensors;

(b) receiving an electronic signal from the ultrasonic sensor of step (a);

(c) sending an electronic signal to another one of the of the plurality of ultrasonic sensors only after step (b) has been performed; and (d) receiving an electronic signal from the ultrasonic sensor of step (c).

Aspect 37. The method of Aspect 36, further comprising the step of:

(e) repeating steps (a) through (d) so that steps (a) and (b) or steps (c) and (d) have been performed a first time for each ultrasonic sensor of the plurality of ultrasonic sensors.

Aspect 38. The method of Aspect 37, further comprising the step of:

(f) repeating steps (a) through (d) so that steps (a) and (b) or steps (c) and (d) have been performed a second time for each ultrasonic sensor of the plurality of ultrasonic sensors, wherein step (f) is performed only after step (e) has been performed.

Aspect 39. The method of any of Aspects 36 through 38, wherein electronic signals are sent to the plurality of ultrasonic sensors using a plurality of inner conductors of a multi conductor shielded cable, and wherein electronic signals are received from the plurality of ultrasonic sensors using an outer shield of the multi conductor shielded cable.

Aspect 40. A method of assembling a probe comprising a neck tube, a collar, an inner tube, an outer tube, and a plurality of ultrasonic sensors, the method comprising:

(a) coupling the inner tube to the collar;

(b) coupling the collar to the neck tube;

(c) coupling the plurality of ultrasonic sensors to a sidewall of the inner tube; and (d) only after performing steps (a) through (c), coupling the outer tube to the collar, thereby creating an internal volume between the inner tube and the outer tube that encloses the plurality of ultrasonic sensors.

Aspect 41. The method of Aspect 40, further comprising:

(e) prior to coupling the outer tube to the collar, providing electrical current to one or more ultrasonic sensors of the plurality of ultrasonic sensors via one or more wires extending from each of the plurality of ultrasonic sensors, through the internal volume, through the collar, and through the neck tube.

Aspect 42. The method of Aspects 40 or 41, wherein an upper opening of the inner tube is welded to a side opening of the collar, an upper opening of the collar is welded to a lower opening of the neck tube, and a lower opening of the collar is welded to an upper opening of the outer tube.

Aspect 43. The method of any of Aspects 40 through 42, wherein coupling the outer tube to the collar comprises welding the outer tube to the collar.

Aspect 44. The method of any of Aspects 40 through 43, further comprising:

(e) prior to coupling the outer tube to the collar, connecting all ultrasonic sensors of the plurality of ultrasonic sensors to a controller by a single multi conductor shielded cable.

Aspect 45. The method of any of Aspects 40 through 44, further comprising:

(e) prior to coupling the outer tube to the collar, connecting a separate signal line that is not individually shielded to each ultrasonic sensor of the plurality of ultrasonic sensors, and connecting each ultrasonic sensor of the plurality of ultrasonic sensors to a common return line.

Aspect 46. The method of Aspect 45, wherein each separate signal line is an internal conductor of a multi conductor shielded cable.

Aspect 47. The method of Aspect 46, wherein the common return line is an outer shield of the multi conductor shielded cable.

Aspect 48. A method of assembling a probe, the method comprising:

(a) providing a probe barrel assembly comprising an inner tube;

(b) coupling a neck tube to the probe barrel assembly;

(c) installing a plurality of ultrasonic sensors into the probe barrel assembly; and (d) coupling an outer tube to the probe barrel assembly, wherein step (d) is performed only after steps (a) through (c) have been performed.

Aspect 49. The method of Aspect 48, wherein the probe barrel assembly further comprises a collar welded to the inner tube.

Aspect 50. The method of Aspect 49, wherein coupling the outer tube to the probe barrel assembly comprises welding the outer tube to the collar.

Aspect 51. The method of any of Aspects 48 through 50, further comprising:

(e) prior to coupling the outer tube to the probe barrel assembly, providing electrical current to one or more ultrasonic sensors of the plurality of ultrasonic sensors via one or more wires extending from each of the plurality of ultrasonic sensors.

Aspect 52. The method of any of Aspects 48 through 51, wherein step (c) comprises:

coupling the plurality of ultrasonic sensors to a sidewall of the inner tube; and connecting all ultrasonic sensors of the plurality of ultrasonic sensors to a controller by a multi conductor shielded cable.

Aspect 53. The method of any of Aspects 48 through 51, wherein step (c) comprises:

coupling the plurality of ultrasonic sensors to a sidewall of the inner tube;

connecting a separate signal line that is not individually shielded to each ultrasonic sensor of the plurality of ultrasonic sensors; and connecting each ultrasonic sensor of the plurality of ultrasonic sensors to a common return line.

Aspect 54. The method of Aspect 53, wherein each separate signal line is an internal conductor of a multi conductor shielded cable.

Aspect 55. The method of Aspect 54, wherein the common return line is an outer shield of the multi conductor shielded cable.

Aspect 56. An ultrasonic probe comprising:

a plurality of ultrasonic sensors disposed within an internal volume of the ultrasonic probe, wherein each ultrasonic sensor of the plurality of ultrasonic sensors is connected to a separate signal line that is not individually shielded.

Aspect 57. The ultrasonic probe of Aspect 56, wherein each ultrasonic sensor of the plurality of ultrasonic sensors is further connected to a common return line.

Aspect 58. The ultrasonic probe of Aspect 57, wherein the signal line connected to each ultrasonic sensor is an internal conductor of a coaxial cable and the common return line is an outer shield of the coaxial cable.

Aspect 59. The ultrasonic probe of Aspect 56, further comprising a coaxial cable, wherein all ultrasonic sensors of the plurality of ultrasonic sensors are connected to the coaxial cable.

BRIEF DESCRIPTION OF THE DRAWINGS

The present invention will hereinafter be described in conjunction with the appended drawing figures wherein like numerals denote like elements.

FIG. 1A is an exploded perspective view of an ultrasonic probe in accordance with an exemplary embodiment of the present invention;

FIG. 1B is a non-exploded sectional view, taken along line 1B-1B, of the ultrasonic probe of FIG. 1A;

FIG. 3A is an exploded perspective view of an ultrasonic probe in accordance with another exemplary embodiment of the present invention; and FIG. 3B is a non-exploded sectional view, taken along line 3B-3B, of the ultrasonic probe of FIG. 3A.

DETAILED DESCRIPTION OF THE PREFERRED EMBODIMENTS

Figure 2A:
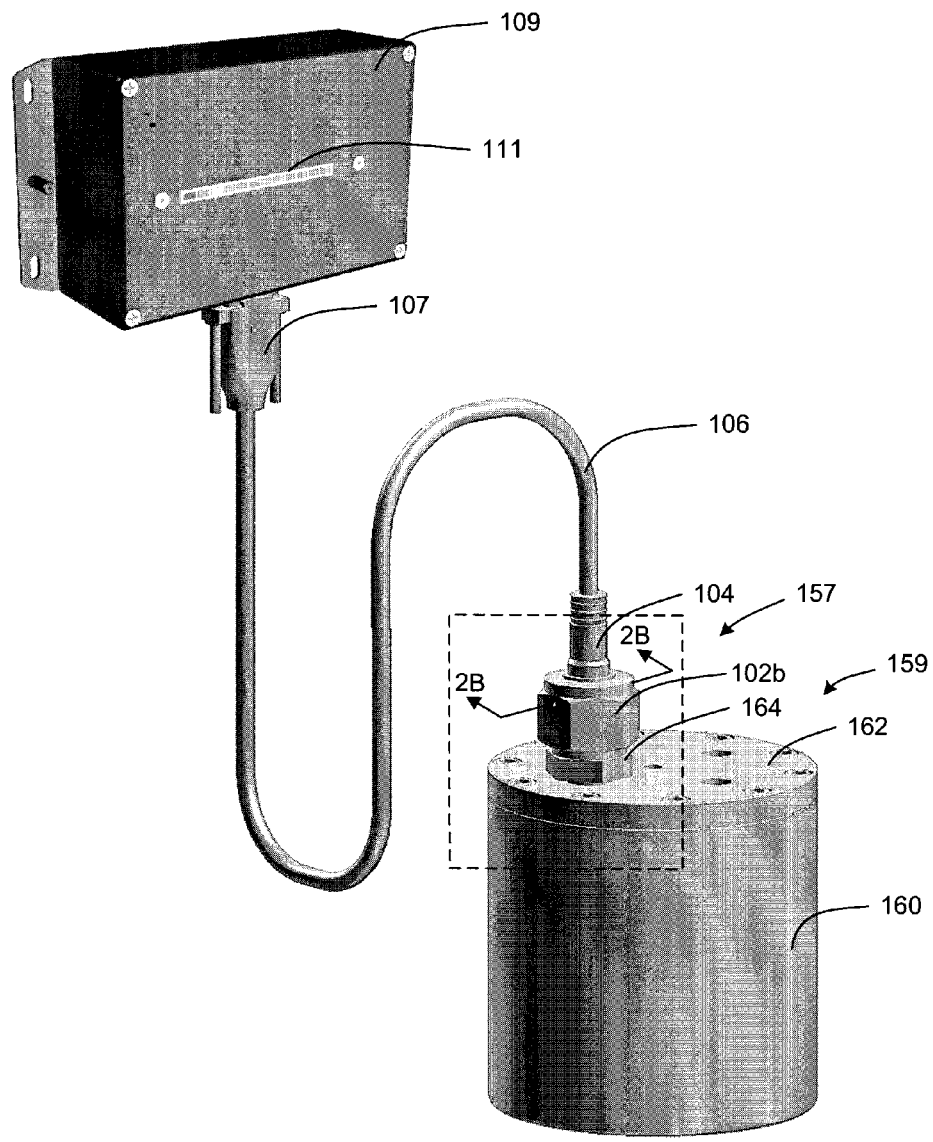
FIG. 2A is a perspective view of the ultrasonic probe of FIGS. 1A and 1B installed on a container in accordance with an exemplary embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

In the figures, elements that are similar to those of other embodiments of the present invention are represented by reference numerals increased by a value of 100. Such elements should be regarded as having the same function and features unless otherwise stated or depicted herein, and the discussion of such elements may therefore not be repeated for multiple embodiments.

The term "conduit," as used in the specification and claims, refers to one or more structures through which fluids can be transported between two or more components of a system. For example, conduits can include pipes, ducts, passageways, and combinations thereof that transport liquids, vapors, and/or gases.

The term "flow communication," as used in the specification and claims, refers to the nature of connectivity between two or more components that enables liquids, vapors, and/or gases to be transported between the components in a controlled fashion (i.e., without leakage). Coupling two or more components such that they are in flow communication with each other can involve any suitable method known in the art, such as with the use of welds, flanged conduits, gaskets, and bolts. Two or more components may also be coupled together via other components of the system that may separate them.

In order to aid in describing the invention, directional terms may be used in the specification and claims to describe portions of the present invention (e.g., upper, lower, left, right, etc.). These directional terms are merely intended to assist in describing and claiming the invention, and are not intended to limit the invention in any way. In addition, reference numerals that are introduced in the specification in association with a drawing figure may be repeated in one or more subsequent figures without additional description in the specification in order to provide context for other features.

FIGS. 1A and 1B show an ultrasonic probe 100 in accordance with an exemplary embodiment of the present invention. More specifically, FIG. 1A shows an exploded perspective view of the ultrasonic probe 100 and FIG. 1B shows a non-exploded sectional view of the ultrasonic probe 100 taken along line 1B-1B of FIG. 1A.

The ultrasonic probe 100 comprises seal fitting members 102a and 102b, a flexible connector 104, a cable sheath 106, a neck tube 108 having a shoulder portion 113, and a barrel 123. As discussed in greater detail herein, the seal fitting members 102a and 102b are portions of a seal fitting assembly 157 (see also FIG. 2B) that secures the ultrasonic probe 100 to a container 159. In this exemplary embodiment, the seal fitting assembly 157 is a face seal fitting assembly, where the seal fitting member 102a is a face seal fitting gland having a through hole 103 and the seal fitting member 102b is a standard sized face seal fitting having a three-quarter-inch (19.1 mm) hex nut. In this embodiment, the seal fitting member 102b rests on a lip 149 of the seal fitting member 102a and can be rotated relative to the seal fitting member 102a about an axis drawn through the through hole 103. In alternative embodiments, as will be apparent to those of ordinary skill in the art, the seal fitting members 102a and 102b can have other dimensions and features, such as a longer gland, a half-inch (12.7 mm) or a non-standard size face seal fitting, and/or a seal fitting member 102b that is bonded to the seal fitting member 102a. Similarly, other types of fittings can be used for seal fitting assembly 157, such as, for example, a surface mount C-seal.

The seal fitting member 102a is coupled to the flexible connector 104 and the cable sheath 106. The neck tube 108 comprises an upper end 110 that defines an upper opening, a lower end 112 that defines a lower opening, and a sidewall 114. In this embodiment, the shoulder portion 113 of the neck tube 108 comprises a shoulder tube 116 having an upper end 118 that defines an upper opening and a lower end 120 that defines a lower opening. The shoulder tube 116 is conical in shape and provides a smooth transition from the neck tube 108 to the outer tube 122 of the barrel 123. The lower end 112 of the neck tube 108 is disposed within the shoulder tube 116 and the shoulder tube 116 is coupled to the sidewall 114 of the neck tube 108. In other embodiments, the entire neck tube 108, including the shoulder portion 113, can be formed of a single unitary part. The upper end 110 of the neck tube 108 is disposed within the through hole 103 of the seal fitting member 102a and within the flexible connector 104.

The barrel 123 comprises an outer tube 122, an inner tube 132, and a disc cap 140. The outer tube 122 has an upper end 124 that defines an upper opening, a lower end 126 that defines a lower opening, a sidewall 128, and a through hole 130 disposed in the sidewall 128 near the upper end 124. The upper end 124 of the outer tube 122 is coupled to the lower end 120 of the shoulder tube 116.

The inner tube 132 comprises an upper end 134 that defines an upper opening, a lower end 136 that defines a lower opening, and a sidewall 138. In this exemplary embodiment, the upper end 134 defines an upper opening that is approximately perpendicular to the lower opening defined by the lower end 136. The inner tube 132 defines a conduit 144 (see FIG. 1B). In should be understood that, in other embodiments of the invention, the conduit may not be fully enclosed, as is the case with ultrasonic probe 100. For example, in a probe having a "tuning fork" style barrel (i.e., having two spaced-apart members extending downwardly) the conduit could comprise a space located between the two spaced-apart members.

The disc cap 140 comprises an inner rim 142 that defines an opening. In an assembled configuration, the entirety of the inner tube 132 is disposed within the outer tube 122, the upper end 134 of the inner tube 132 is aligned with the through hole 130 disposed in the sidewall 128, and the lower end 136 of the inner tube 132 is aligned with the lower end 126 of the outer tube 122. The upper end 134 of the inner tube 132 is coupled to the sidewall 128. The disc cap 140 is coupled to the lower end 126 of the outer tube 122 and the lower end 136 of the inner tube 132, thereby coupling the lower end 126 of the outer tube 122 to the lower end 136 of the inner tube 132.

The conduit 144 is disposed within the barrel 123 and has a lower opening defined by the lower end 136 of the inner tube 132 (the lower opening can also be regarded as being defined by the inner rim 142 of the disc cap 140) (see FIG. 1B). When the barrel 123 is inserted into a container (see container 159 of FIGS. 2A and 2B), the conduit 144 is in flow communication with the internal volume of the container that holds liquid such that the liquid can flow through the conduit 144.

The sidewall 128 of the outer tube 122 and the sidewall 138 of the inner tube 132 define an internal volume 146 (i.e., a compartment) therebetween that is also bounded by the disc cap 140, as shown. The internal volume 146 is isolated from the conduit 144 (i.e., the internal volume 146 is not in flow communication with the conduit 144) such that any liquid flowing through the conduit 144 cannot enter the internal volume 146.

A plurality of ultrasonic sensors 156 is disposed within the internal volume 146 of the barrel 123. In this exemplary embodiment, the plurality of ultrasonic sensors 156 includes twelve (12) ultrasonic sensors 156a through 156l that are coupled to the sidewall 138 of the inner tube 132. In this embodiment, each of the plurality of ultrasonic sensors 156 is bonded to the sidewall 138 with an epoxy. Other suitable means for coupling can also be used, such as double-sided tape or other adhesives. In other embodiments, the plurality of ultrasonic sensors 156 can include a greater or lesser number of sensors. Preferably the plurality of ultrasonic sensors 156 includes at least 5 ultrasonic sensors. The plurality of ultrasonic sensors 156 can be implemented with any suitable ultrasonic sensors that are known to those of ordinary skill in the art, such as, for example, piezoelectric crystals. Each ultrasonic sensor of the plurality of ultrasonic sensors 156 is oriented to emit sound waves through the sidewall 138 and the conduit 144 (and any liquid present therein) and detect the sound waves that are echoed back. Each ultrasonic sensor of the plurality of ultrasonic sensors 156 includes wiring 158 (comprising at least one wire) that extends from the internal volume 146, through the neck tube 108, and through the cable sheath 106. The wiring 158 is terminated at a connector 107 that is plugged into a controller 109 (see FIG. 2A).

The controller 109 is a programmable data processing device that transmits electronic signals to the plurality of ultrasonic sensors 156, receives electronic signals from the plurality of ultrasonic sensors 156, and determines the level of liquid within a container into which the ultrasonic probe 100 is inserted. In this embodiment, the controller 109 comprises one or more microprocessors (not shown), a power supply (not shown), at least one input/output port (not shown) to receive the connector 107, and a light-emitting-diode (LED) meter 111 that provides a visual indication of the amount of liquid within the container. In alternative embodiments, the controller 109 can include other input/output ports and/or other aural and visual mechanisms for indicating the level of liquid within the container. Similarly, the controller 109 may be implemented with any type of programmable data processing device, including a personal computer executing control software.

For each ultrasonic sensor of the plurality of ultrasonic sensors 156, the controller 109 transmits an electronic signal (i.e., a pulse) to the ultrasonic sensor via the wiring 158, which causes the ultrasonic sensor to emit sound waves (i.e., the piezoelectric crystal oscillates). The ultrasonic sensor then receives echoed sound waves and converts the echoed waves into an electronic signal that is transmitted back to the controller 109 via the wiring 158. As previously discussed, the controller 109 interprets the intensity of the received signal as well as the time that elapsed between sending the electronic signal to the ultrasonic sensor and receiving the electronic signal from the ultrasonic sensor to determine whether there is liquid at the portion of the conduit 144 at which that particular sensor is disposed. Accordingly, by using the plurality of ultrasonic sensors 156, the controller 109 can determine the level of liquid along the length of the conduit 144 and therefore the amount of liquid within the container into which the barrel 123 is inserted. Each sensor of the plurality of ultrasonic sensors 156 is represented by an LED in the LED meter 111 to provide a visual indication of the amount of liquid within the container (e.g., each LED is illuminated only when liquid is detected by a particular sensor).

The controller 109 can be programmed to transmit signals to, and receive signals from, less than all of the ultrasonic sensors 156a through 156l of the plurality of ultrasonic sensors 156 at the same time. This feature eliminates the need for the wiring 158 for the plurality of ultrasonic sensors 156 to be individually shielded and also allows the ultrasonic sensors 156a through 156l to be disposed closer together. In prior art systems, the wiring that connects the ultrasonic sensors to a controller is typically individually shielded to protect against interference (i.e., crosstalk) that results from electronic signals being transmitted to and from all of the ultrasonic sensors in the probe at the same time. For example, the wiring for each ultrasonic sensor in a typical prior art design may include a coaxial cable in which the inner conductor serves as the signal line to the ultrasonic sensor and the outer shield serves as the ground (e.g., grounded to a steel tube of the probe) and the signal return from the ultrasonic sensor. In prior art systems, the ultrasonic sensors within the probe must also be spaced farther apart to avoid interference that results from the ultrasonic sensors simultaneously emitting sound waves. Each of these characteristics (i.e., added bulk from multiple shielded cables and greater spacing between sensors) limits the number of ultrasonic sensors that can be disposed in a probe without increasing the size of the probe and related hardware.

In a preferred embodiment, the controller 109 is programmed or otherwise operatively configured to transmit signals to, and receive signals from, one ultrasonic sensor of the plurality of ultrasonic sensors 156 at a time. For example, the controller 109 can be programmed to first transmit an electronic signal to the ultrasonic sensor 156a and await receipt of the return signal from the ultrasonic sensor 156a, then transmit an electronic signal to the ultrasonic sensor 156b and await receipt of the return signal from the ultrasonic sensor 156b, and so on for each ultrasonic sensor of the plurality of ultrasonic sensors 156. Upon having transmitted an electronic signal to, and received an electronic signal from, each of the plurality of ultrasonic sensors 156 a first time (in this embodiment, beginning with ultrasonic sensor 156a and ending with ultrasonic sensor 156l), the controller 109 repeats the sequence and transmits an electronic signal to, and receives an electronic signal from, the ultrasonic sensor 156a and each of the plurality of ultrasonic sensors 156 a second time, and so on for as long as the ultrasonic probe 100 is being operated. In this manner, the potential for interference between the wiring 158 for each ultrasonic sensor 156a through 156l and between the ultrasonic sensors themselves is greatly reduced or eliminated because the ultrasonic sensors 156a through 156l are not all simultaneously emitting or receiving sound waves and the wiring 158 for each of the ultrasonic sensors 156a through 156l is not simultaneously carrying electronic signals.

This method of operating the plurality of ultrasonic sensors 156 eliminates the need for the wiring 158 for each ultrasonic sensor 156a through 156l to be individually shielded and the ultrasonic sensors 156a through 156l can be disposed closer together (i.e., even closer than is shown in FIG. 1B), both of which enable a greater number of ultrasonic sensors to be disposed within the barrel 123. In an exemplary configuration, the wiring 158 comprises a multi conductor shielded cable having a plurality of inner conductors that are not individually shielded, where a separate inner conductor is connected to each ultrasonic sensor of the plurality of ultrasonic sensors 156 to serve as the signal line, and an outer shield of the multi conductor shielded cable serves as a common return line and ground for all of the ultrasonic sensors of the plurality of ultrasonic sensors 156. For example, a coaxial cable can be used as the multi conductor shielded cable, where the inner conductors are connected to the plurality of ultrasonic sensors 156 to serve as the signal lines, and the outer shield of the coaxial cable serves as the common return line.

The neck tube 108 is disposed within the seal fitting members 102a and 102b and the flexible connector 104. The neck tube 108 is secured to the seal fitting member 102a by a fusion weld (i.e., a bead) made within the weld zone 148. Preferably, the weld occupies only a portion of the weld zone 148 and is made where the sidewall 114 of the neck tube 108 abuts the seal fitting member 102a. The seal fitting member 102a includes a protruding sealing surface (i.e., a seal face) 150 that extends around the neck tube 108. The protruding sealing surface 150 has an inner edge 151 that is separated from the sidewall 114 of the neck tube 108 by a distance D1. In order to prevent impairment of the protruding sealing surface 150 by a weld within the weld zone 148 (e.g., welding material can create a raised surface and/or the heat of welding can deform the protruding sealing surface 150), distance D1 is preferably at least 2.0 mm and, more preferably, at least 6.0 mm. The seal fitting member 102b includes a threaded region 152 that engages an opposite threaded region 166 of another seal fitting member 164 (see FIG. 2B) of the seal fitting assembly 157, as discussed later in this specification. Testing ports 154a and 154b are used for leak detection when the ultrasonic probe 100 is secured to the container 159, as discussed in greater detail with regard to FIG. 2B.

The barrel 123 has an outer diameter D3 (i.e., the outer diameter of the outer tube 122). The neck tube 108 and the inner tube 132 have an outer diameter D2 that is less than the outer diameter D3 of the barrel 123. The larger outer diameter D3 of the barrel 123 relative to the outer diameter D2 of the inner tube 132 provides an increased amount of space within the internal volume 146 that is necessary to house the increased number of ultrasonic sensors 156a through 156l and their respective wiring 158. Preferably, the ratio of the outer diameter D2 of the inner tube 132 to the outer diameter D3 of the barrel 123 is less than or equal to 0.95. More preferably, the ratio of the outer diameter D2 of the inner tube 132 to the outer diameter D3 of the barrel 123 is less than or equal to 0.95 and greater than or equal to 0.3. More preferably, the ratio of the outer diameter D2 of the inner tube 132 to the outer diameter D3 of the barrel 123 is less than or equal to 0.8, and the outer diameter D3 of the barrel 123 is no greater than 0.827 inches (21.0 mm). More preferably, the ratio of the outer diameter D2 of the inner tube 132 to the outer diameter D3 of the barrel 123 is less than or equal to 0.8 and greater than or equal to 0.4. More preferably, the outer diameter D2 of the inner tube 132 is approximately five-sixteenths of an inch (7.9 mm), and the outer diameter D3 of the barrel 123 is approximately five-eighths of an inch (15.9 mm). Preferably, there exists a minimum distance between the sidewall 128 of the outer tube 122 and the sidewall 138 of the inner tube 132 of at least 0.10 inches (2.5 mm) where the plurality of ultrasonic sensors 156 includes four ultrasonic sensors, and a minimum distance of at least 0.15 inches (3.8 mm) where the plurality of ultrasonic sensors 156 includes the twelve (12) ultrasonic sensors 156a through 156l.

FIG. 2A shows a perspective view of the ultrasonic probe 100 installed on a container 159 in accordance with an exemplary embodiment of the present invention. The ultrasonic probe 100 includes the controller 109 and the LED meter 111, as previously discussed. The container 159 comprises a body 160, an upper portion 162, and a seal fitting member 164 coupled to the upper portion 162. As will be apparent to those of ordinary skill in the art, the container 159 may include other components that are not shown in FIGS. 2A and 2B for clarity and illustrative purposes (e.g., additional valves and hardware for refilling the container 159). The body 160 and upper portion 162 define an internal volume that can contain fluid. In this embodiment, the upper portion 162 is a lid coupled to the body 160. In other embodiments, the upper portion 162 can be an integral part of the body 160. The seal fitting member 164, like the seal fitting members 102a and 102b, is a portion of the seal fitting assembly 157 that secures the ultrasonic probe 100 to the container 159. In this exemplary embodiment, the components of the container 159 are composed of one or more metals.

Figure 2B:
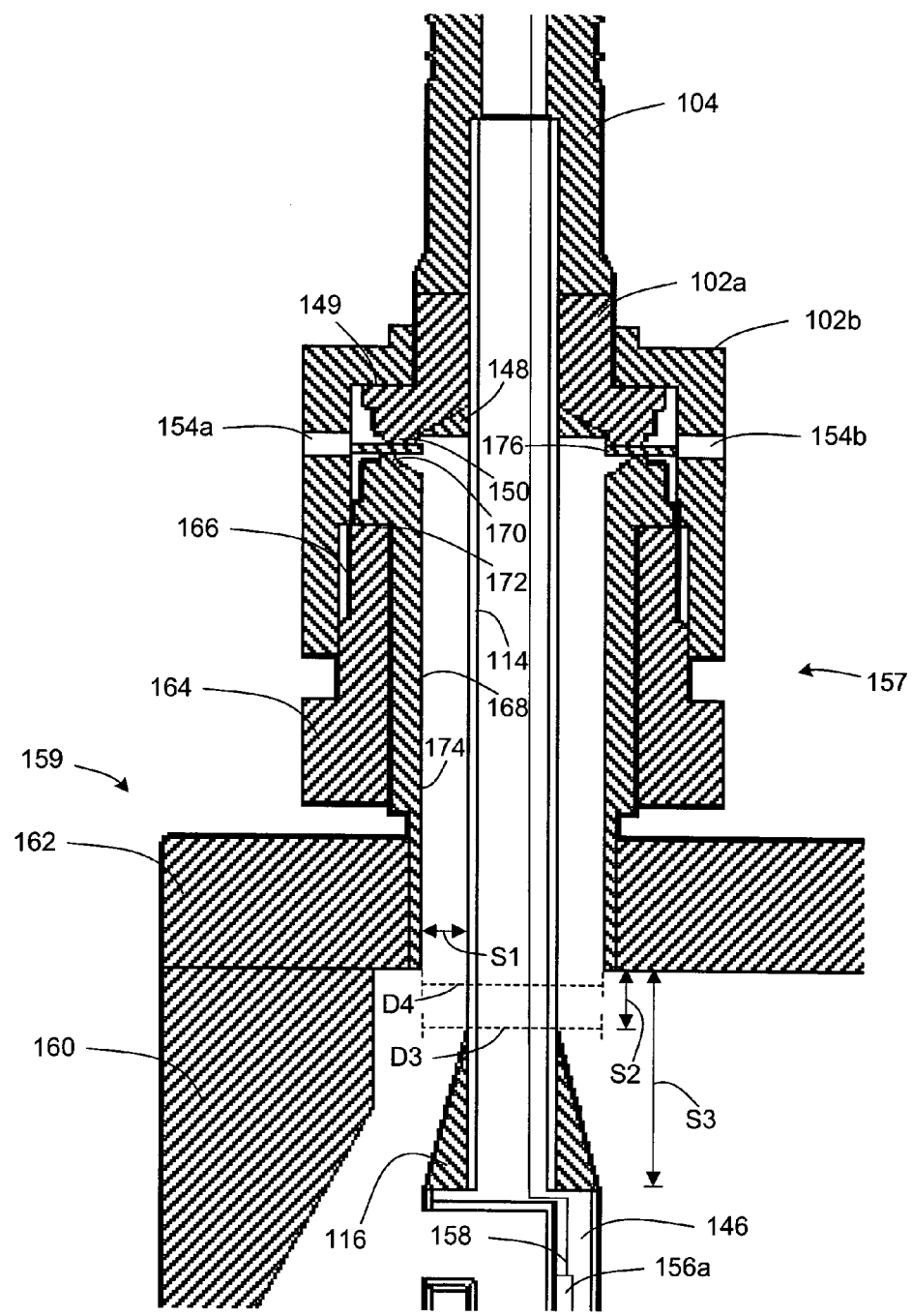
FIG. 2B is an enlarged, partial sectional view, taken along line 2B-2B, of portions of the ultrasonic probe and container shown within the dashed-line area of FIG. 2A.

FIG. 2B shows a cross sectional view of the portion the ultrasonic probe 100 and container 159 within the dashed box of FIG. 2A, taken along the line 2B-2B. As shown, a stem 168 is disposed in a hole in the upper portion 162 of the body 160 of the container 159. In this embodiment, the stem 168 is a face seal fitting gland that is bonded (e.g., welded) to the upper portion 162 of the body 160. The stem 168 comprises a protruding sealing surface 170, a lip 172, and a sidewall 174. The sidewall 174 of the stem 168 has an inner diameter D4 that is greater than the outer diameter D3 of the barrel 123 such that the barrel 123 can be inserted into the stem 168. The seal fitting member 164 is disposed around the stem 168 and comprises a threaded region 166 that engages the threaded region 152 of the seal fitting member 102b (i.e., the threaded regions 152 and 166 have complimentary threading such as female and male threading, respectively). A metal gasket 176 having a through hole is disposed between the protruding sealing surface 150 of the seal fitting member 102a and the protruding sealing surface 170 of the stem 168.

In a fully installed configuration, the barrel 123 is inserted through the metal gasket 176 and the stem 168 such that the barrel is disposed inside of the container 159 and the neck tube is disposed within the stem 168 and the metal gasket 176. The threaded region 152 of the seal fitting member 102b is then threaded onto the threaded region 166 of the seal fitting member 164 such that the seal fitting member 102b engages (i.e., presses against) the lip 149 of the seal fitting member 102a, the seal fitting member 164 engages the lip 172 of the stem 168, and the metal gasket 176 is compressed between the protruding sealing surface 150 of the seal fitting member 102a and the protruding sealing surface 170 of the stem 168. In this manner, the protruding sealing surface 170, the protruding sealing surface 150, and the metal gasket 176 form a metal-on-metal seal that prevents fluid (i.e., liquid, vapor, and/or gas) from escaping or entering the container 159.

In the fully installed configuration, in this exemplary embodiment, a distance S1 exists between the sidewall 114 of the neck tube 108 and the sidewall 174 of the stem 168; a distance S2 exists between the upper portion 162 (i.e., lid) of the container 159 and the upper end 118 of the shoulder tube 116, and the upper end 118 of the shoulder tube 116 is located below the lower-most portion of the stem 168; and a distance S3 exists between the upper portion 162 of the container 159 and the upper end 124 of the outer tube 122 of the barrel 123. Preferably, the distance S2 is greater than or equal to 0.10 inches (2.5 mm) and the distance S1 is greater than or equal to 0.70 mm. Generally, the distances S1, S2 and S3 are preferably large enough to allow fluid to travel in between the sidewall 114 of the neck tube 108 and the sidewall 174 of the stem 168, but also drain back down and return into the container 159 under the force of gravity. Stated differently, the distances S1, S2 and S3 are preferably large enough to avoid capillary action in which fluid is retained between the sidewall 114 of the neck tube 108 and the sidewall 174 of the stem 168. Avoiding such capillary action helps maximize the usable quantity of chemical reagent that can be drawn out of the container 159 for use, and also ensures that during cleaning of the container 159 and the ultrasonic probe 100 in the fully installed configuration, no residual chemicals are left behind to potentially contaminate fresh chemical reagent that is later added to the container 159.

The ultrasonic probe 100 satisfies a need in the art for an ultrasonic probe having increased quantities of ultrasonic sensors that can be used with existing container fittings having standardized dimensions. The barrel 123 has an outer diameter D3 that provides an increased amount of space within the internal volume 146 that is necessary to house the increased number of ultrasonic sensors 156a through 156l and their respective wiring 158. In prior art ultrasonic probe designs, the barrel typically extends into the seal fitting assembly. An increased outer diameter of the barrel would therefore require a larger and/or non-standard seal fitting assembly, or modifying a standard seal fitting assembly such as by boring out a through hole (e.g., through hole 103 of the seal fitting member 102a) so it can receive the larger barrel diameter. However, non-standard fitting assemblies are typically much more expensive than their standardized counterparts and may also require the use of other non-standardized components. Non-standard fitting assemblies also do not benefit from the extensive testing and proven history of standardized fitting assemblies for use in semiconductor manufacturing processes. Larger seal fittings also require more space on the lid of the container (e.g., upper portion 162) and can make obtaining a tight seal more difficult. Finally, the inventors have found that attempts to modify standard seal fitting assemblies to receive a larger barrel diameter can negatively affect the structural integrity of the ultrasonic probe and/or the seal fitting assembly. For example, referring to FIG. 1B, if the through hole 103 in the seal fitting member 102a was bored out to receive the larger outer diameter D2 instead of the outer diameter D2 of the neck tube 108, the distance D1 would be decreased. As a result, the size of the weld zone 148 would also be decreased, and the heat of welding could damage (i.e., warp) the protruding sealing surface 150 and negatively affect the integrity of the seal made between the protruding sealing surface 150 and the metal gasket 176.

Unlike prior art probe designs, the barrel 123 of the ultrasonic probe 100 does not extend into the seal fitting member 102a. Instead, the barrel 123 is coupled to the neck tube 108, which is in turn coupled to the seal fitting member 102a. The stem 168 is bored out such that the inner diameter D4 of the stem 168 is greater than the outer diameter D3 of the barrel 123 and the barrel 123 can be inserted into the stem 168. The neck tube 108 has an outer diameter D2 that is less than the outer diameter D3 of the barrel 123 (i.e., the ratio of D2 to D3 is less than one), which enables the through hole 103 of the seal fitting members 102a to have a smaller bore size, as opposed to requiring a larger seal fitting (e.g., a 1 inch seal fitting) or boring out the through hole 103 in the seal fitting member 102a to accommodate the increased outer diameter D3 of the barrel 123. The smaller outer diameter D2 of the neck tube 108 also provides the necessary distance D1 to have a sufficiently large weld zone 148 such that the neck tube 108 and the seal fitting member 102a can be welded together without welding material and/or welding heat impairing the protruding sealing surface 150. Preventing such damage to the protruding sealing surface 150 is critical to maintaining the integrity of the seal between the protruding sealing surface 150 and the metal gasket 176, and therefore maintaining the assay (purity) of the chemical reagent for use in semiconductor manufacturing.

Figures 4A, 4B:
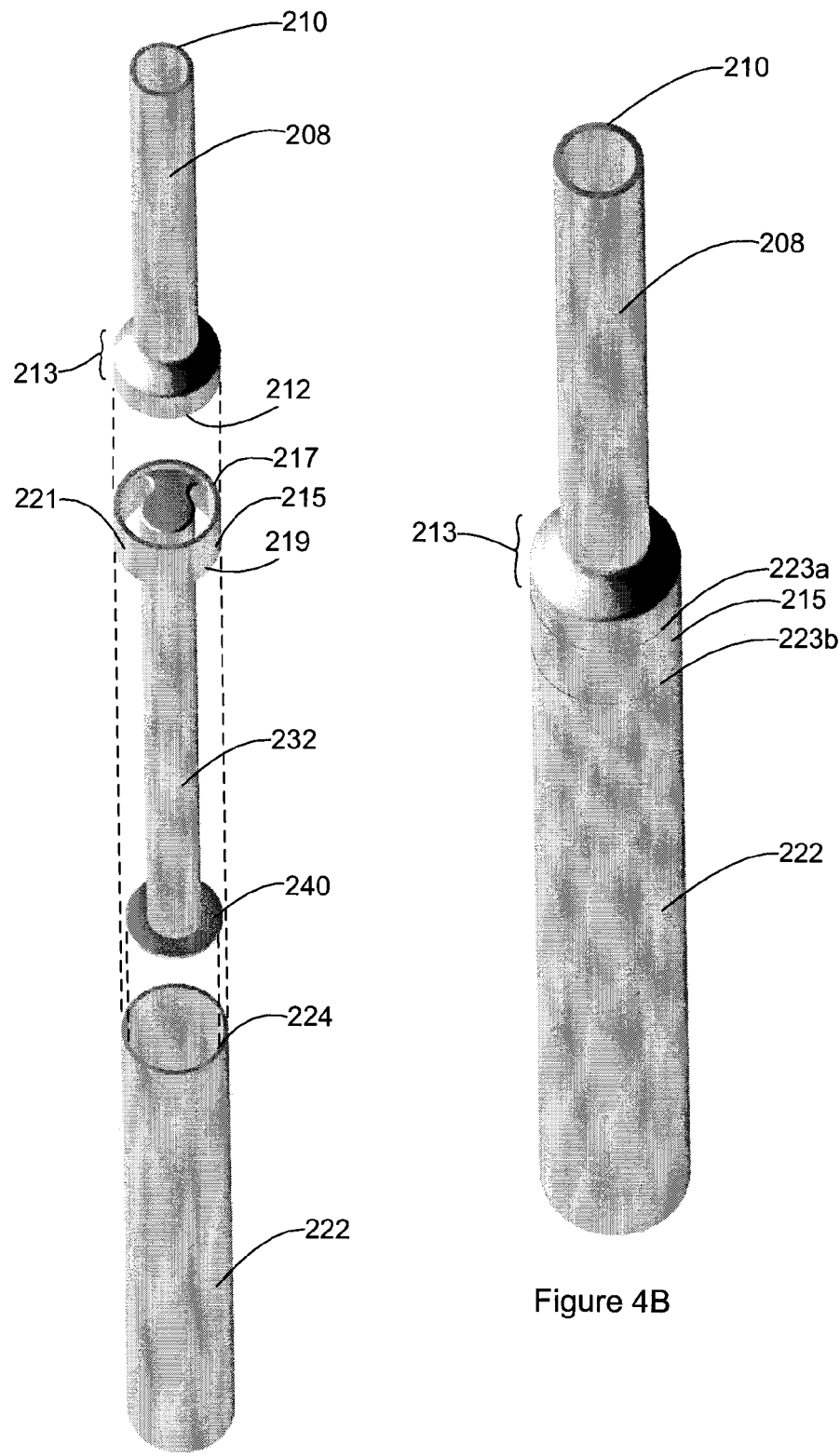
FIG. 4A is an exploded perspective view of certain components of the ultrasonic probe of FIGS. 3A and 3B.
FIG. 4B is a non-exploded perspective view of the components of the ultrasonic probe shown in FIG. 4A.

FIG. 3A is an exploded perspective view of an ultrasonic probe 200 in accordance with another exemplary embodiment of the present invention. FIG. 3B is a non-exploded sectional view of the ultrasonic probe 200 taken along line 3B-3B. FIG. 4A is an exploded perspective view of certain components of the ultrasonic probe 200, and FIG. 4B is a non-exploded perspective view of the components of the ultrasonic probe 200 shown in FIG. 4A.

The ultrasonic probe 200 shares many similarities with the ultrasonic probe 100, but differs with respect to the construction of the neck tube 208 and the barrel 223. In this embodiment, the shoulder portion 213 of the neck tube 208 is formed by the sidewall 214 (rather than a separate piece, as is the case with shoulder tube 116 of ultrasonic probe 100) and is integral with the remainder of the neck tube 208 (i.e., the neck tube 208 and shoulder portion 213 are a single piece of material). The shoulder portion 213 has a bell shape that begins at the portion of the sidewall 214 indicated at 211 and transitions from the outer diameter D2 of the neck tube 208 to the outer diameter D3 of the neck tube 208, which is also the outer diameter of the barrel 223. The lower end 212 of the neck tube 208 also defines a lower opening having a diameter that is greater than the outer diameter D2 of the neck tube 208.

In this embodiment, the barrel 223 comprises a collar 215, an outer tube 222, an inner tube 232, and a disc cap 240. The collar 215 comprises upper end 217 defining an upper opening, a lower end 219 defining a lower opening, a sidewall 221, and a through hole 225 disposed in the sidewall 221.

Unlike the ultrasonic probe 100, the outer tube 222 of the ultrasonic probe 200 does not include a through hole disposed in the sidewall 228, and the upper end 224 of the outer tube 222 is not coupled to a shoulder tube or to the lower end 212 of the neck tube 208. Instead, the upper end 234 of the inner tube 232 is aligned with the through hole 225 disposed in the sidewall 221 of the collar 215, with the upper end 234 of the inner tube 232 being coupled to the sidewall 221 of the collar 215. The upper end 217 of the collar 215 is coupled to the lower end 212 of the neck tube 208, and the upper end 224 of the outer tube 222 is coupled to the lower end 219 of the collar 215. The disc cap 240 is coupled to the lower end 226 of the outer tube 222 and the lower end 236 of the inner tube 232, thereby coupling the lower end 226 of the outer tube 222 to the lower end 236 of the inner tube 232.

The collar 215 enables the barrel 223 to be constructed as one or more assemblies. This feature has been found to be advantageous because the barrel 223 can be partially assembled and the plurality of ultrasonic sensors 256 can be tested prior to completing assembly of the barrel 223 and enclosing the plurality of ultrasonic sensors 256 in the internal volume 246. In addition, this feature is advantageous because most of the components of the barrel 223 can be welded together prior to installing the plurality of ultrasonic sensors 256, where the heat from welding might otherwise damage the plurality of ultrasonic sensors 256 and/or the bonds which hold the plurality of ultrasonic sensors 256 in place within the internal volume 246.

In a preferred embodiment, for example, an assembly is first constructed comprising the collar 215, the inner tube 232, and the disc cap 240 by welding the upper end 234 of the inner tube 232 to the collar 215 and welding the lower end 236 of the inner tube 232 to the disc cap 240. The assembly is then coupled to the neck tube 208 by welding the upper end 217 of the collar 215 to the lower end 212 of the neck tube 208. The plurality of ultrasonic sensors 256 are then installed into the assembly by coupling the plurality of ultrasonic sensors 256 to the sidewall 238 (see FIG. 3B) via epoxy or other known means of attachment. The wiring 258 (comprising at least one wire) that is coupled to each ultrasonic sensor of the plurality of ultrasonic sensors 256 is extended along the sidewall 238, through the collar 215, and through the shoulder portion 213 and remainder of the neck tube 208. The wiring 258 that is coupled to each ultrasonic sensor, like the wiring 158 of the ultrasonic probe 100, does not need to be individually shielded, and the wiring 258 can be implemented with a multi conductor shielded cable having separate inner conductors for each ultrasonic sensor and an outer shield that serves as a common return line and ground for all of the ultrasonic sensors of the plurality of ultrasonic sensors 256. At this point, the plurality of ultrasonic sensors 256 can be tested (e.g., by connecting them to a controller and providing electrical current), adjusted, and/or replaced while they are still easily accessible. Further, any welds whose heat might damage the ultrasonic sensors 256 and/or their bonds to the sidewall 238 have already been performed prior to installing the plurality of ultrasonic sensors 256.

Assembly of the barrel 223 can then be completed by coupling the outer tube 222 to the assembly. In this example, the outer tube 222 slides over the disc cap 240 and over the inner tube 232 until the upper end 224 of the outer tube 222 abuts the lower end 219 of the collar 215. The collar 215 is coupled to the neck tube 208 via a weld along a circumferential weld line 223a (see FIG. 4B) and to the outer tube 222 via a weld along a circumferential weld line 223b, thereby enclosing the plurality of ultrasonic sensors 256 in the internal volume 246 defined between the sidewall 228 of the outer tube 222 and the sidewall 238 of the inner tube 232. The inventors have found that when welding along the circumferential weld lines 223a and 223b from the outside of the barrel 223, any heat generated within the internal volume 246 is not great enough to damage the plurality of ultrasonic sensors 256 and/or the bonds which hold the plurality of ultrasonic sensors 256 in place within the internal volume 246.

The ultrasonic probe 200 can be used in conjunction with the seal fitting assembly 157 to install the ultrasonic probe 200 on the container 159 in the manner previously discussed with regard to the ultrasonic probe 100. However, when the ultrasonic probe 200 is fully installed on the container 159, the equivalent distance S2 is measured between the upper portion 162 of the container 159 and the portion of the sidewall 214 indicated at 211 (i.e., the uppermost portion of the shoulder portion 213) rather than the upper end 118 of the shoulder tube 116, and the equivalent distance S3 is measured between the upper portion 162 of the container 159 and the upper end 217 of the collar 215 rather than the upper end of the outer tube 122.

While the principles of the invention have been described above in connection with preferred embodiments, it is to be clearly understood that this description is made only by way of example and not as a limitation of the scope of the invention.

The invention claimed is:

1. A system comprising:
   a controller that is operatively configured to send and receive electronic signals;
   an ultrasonic probe comprising a fitting assembly, a barrel extending downwardly from the fitting assembly, and a plurality of ultrasonic sensors located within the barrel, each of the plurality of ultrasonic sensors being adapted to receive electronic signals sent from the controller, emit sound waves in response to the electronic signals sent from the controller, detect sound waves, and transmit electronic signals to the controller indicative of the detected sound waves; and
   a multi conductor shielded cable, wherein each of the plurality of ultrasonic sensors is connected to a separate signal line that is not individually shielded and each of the plurality of ultrasonic sensors is connected to a common return line, each signal line comprising an internal conductor of a coaxial cable and the common return line comprising an outer shield of the coaxial cable;
   wherein the controller is programmed to send electronic signals to only one of the plurality of ultrasonic sensors at a time.

2. The system of claim 1, wherein the controller is programmed to send an electronic signal to a first ultrasonic sensor of the plurality of ultrasonic sensors and receive an electronic signal from the first ultrasonic sensor of the plurality of ultrasonic sensors prior to sending an electronic signal to any other ultrasonic sensor of the plurality of ultrasonic sensors.

3. The system of claim 1, wherein the plurality of ultrasonic sensors includes at least 5 ultrasonic sensors.

4. The system of claim 1, wherein the plurality of ultrasonic sensors includes at least 12 ultrasonic sensors.

5. The system of claim 1, wherein the barrel further comprises a conduit.

6. The system of claim 5, wherein the conduit has a lower opening at a lower end of the barrel and an upper opening located in a sidewall of the barrel.

7. The system of claim 5, wherein the barrel further comprises an outer tube, an inner tube, and an internal volume located between the inner tube and the outer tube, the inner tube defining the shape of the conduit, the internal volume being isolated from the conduit.

8. The system of claim 7, wherein the plurality of ultrasonic sensors are located in the internal volume and coupled to the inner tube.

9. The system of claim 1, further comprising a container, wherein the barrel of the ultrasonic probe is adapted to be inserted into the container and the container includes a seal fitting member which is adapted to secure the ultrasonic probe to the container.

10. A method of operating a probe having a plurality of ultrasonic sensors, the method comprising:
   (a) sending an electronic signal to one of the plurality of ultrasonic sensors using one conductor of a plurality of inner conductors of a coaxial cable, wherein each conductor of the plurality of conductors is insulated but not individually shielded;
   (b) receiving an electronic signal from the ultrasonic sensor of step (a) using an outer shield of the coaxial cable;
   (c) sending an electronic signal to another one of the of the plurality of ultrasonic sensors only after step (b) has been performed;
   (d) receiving an electronic signal from the ultrasonic sensor of step (c);
   (e) repeating steps (a) through (c) with each of the plurality of ultrasonic sensors, using a different conductor for step (a) for each of the plurality of ultrasonic sensors.

11. An ultrasonic probe comprising:
   a plurality of ultrasonic sensors disposed within an internal volume of the ultrasonic probe, wherein each ultrasonic sensor of the plurality of ultrasonic sensors is connected to a separate signal line that is not individually shielded and each ultrasonic sensor of the plurality of ultrasonic sensors being connected to a common return line, each signal line comprising an internal conductor of a coaxial cable and the common return line comprising an outer shield of the coaxial cable.

12. The ultrasonic probe of claim 11, wherein the plurality of ultrasonic sensors includes at least 5 ultrasonic sensors.

13. The ultrasonic probe of claim 11, wherein the plurality of ultrasonic sensors includes at least 12 ultrasonic sensors.

14. The ultrasonic probe of claim 11, further comprising a barrel, a neck tube connected to a top end of the barrel, and a fitting assembly connected to an end of the neck tube that is distal to the barrel.

15. The ultrasonic probe of claim 11, further comprising a barrel having a conduit.

16. The ultrasonic probe of claim 15, wherein the conduit has a lower opening at a lower end of the barrel and an upper opening located in a sidewall of the barrel.

17. The ultrasonic probe of claim 16, wherein the barrel further comprises an outer tube, an inner tube, and an internal volume located between the inner tube and the outer tube, the inner tube defining the shape of the conduit, the internal volume being isolated from the conduit.

18. The ultrasonic probe of claim 17, wherein the plurality of ultrasonic sensors are located in the internal volume and coupled to the inner tube.

* * * * *